(12) United States Patent
Yoo

(10) Patent No.: US 6,883,009 B2
(45) Date of Patent: Apr. 19, 2005

(54) IMAGE DATA MANAGEMENT METHOD AND SYSTEM USING NETWORK

(75) Inventor: Hyun June Yoo, Seoul (KR)

(73) Assignee: MTEK Vision Co., Ltd. (KR)

( * ) Notice: Subject to any disclaimer, the term of this patent is extended or adjusted under 35 U.S.C. 154(b) by 446 days.

(21) Appl. No.: 10/193,787

(22) Filed: Jul. 12, 2002

(65) Prior Publication Data

US 2003/0014430 A1 Jan. 16, 2003

(30) Foreign Application Priority Data

Jul. 14, 2001 (KR) .................................... 2001-42617

(51) Int. Cl.[7] .............................................. G06F 17/30
(52) U.S. Cl. ................... 707/104.1; 707/102; 707/100; 358/1.9; 358/1.15; 358/1.16; 345/590; 382/167; 378/4
(58) Field of Search ................................ 707/100, 102, 707/104.1; 307/10.1; 358/1.9, 1.15, 1.16; 345/590; 378/4; 382/167; 715/502, 804

(56) References Cited

U.S. PATENT DOCUMENTS

| | | | | |
|---|---|---|---|---|
| 5,675,717 A | * | 10/1997 | Yamamoto .................. | 358/1.9 |
| 5,870,771 A | * | 2/1999 | Oberg ......................... | 715/502 |
| 5,960,162 A | * | 9/1999 | Yamamoto .................. | 358/1.9 |
| 6,028,603 A | * | 2/2000 | Wang et al. ................ | 715/776 |
| 6,097,389 A | * | 8/2000 | Morris et al. ............... | 715/804 |
| 6,108,009 A | * | 8/2000 | Nishikawa .................. | 345/590 |
| 6,292,218 B1 | * | 9/2001 | Parulski et al. ........... | 348/220.1 |
| 6,301,586 B1 | * | 10/2001 | Yang et al. ................ | 707/104.1 |
| 6,370,543 B1 | * | 4/2002 | Hoffert et al. .......... | 707/104.1 |
| 6,668,036 B1 | * | 12/2003 | Numata et al. ................ | 378/4 |
| 6,754,384 B1 | * | 6/2004 | Spaulding et al. .......... | 382/167 |
| 2001/0022471 A1 | * | 9/2001 | Cook et al. ................ | 307/10.1 |
| 2002/0059317 A1 | * | 5/2002 | Black et al. ................ | 707/200 |
| 2002/0097427 A1 | * | 7/2002 | Kazama et al. ............ | 358/1.15 |
| 2002/0140978 A1 | * | 10/2002 | Urabe et al. ............... | 358/1.16 |
| 2002/0194194 A1 | * | 12/2002 | Fenton et al. ............ | 707/104.1 |

FOREIGN PATENT DOCUMENTS

EP         1184802 A2 *   3/2002    ........... G06F/19/00

* cited by examiner

*Primary Examiner*—Frantz Coby
(74) *Attorney, Agent, or Firm*—Cantor Colburn LLP

(57) ABSTRACT

A method for managing an original image data file uploaded from a terminal of a client and a system for materializing the method. The method includes storing the original image data file in a database; generating a preview image data file by using the original image data file, wherein the preview image data file has a predetermined file size smaller than that of the original image data file; storing the preview image data file in the database; and linking the preview image data file with the original image data file. The system includes a storage device a storage device, an image management device, a retrieval device and an image process device. The storage device stores information of a client, original image data files and preview image data files each linked with corresponding one of the original image data files. The image management device generates a preview image data file by using a corresponding original image data file. The retrieval device reads out an original image data file from the storage device, on the basis of search data externally provided. The image process device provides an image selection page to the client terminal and generates the search data for the preview image data file selected by the client.

16 Claims, 13 Drawing Sheets

IMAGE DATA MANAGEMENT METHOD AND SYSTEM USING NETWORK

BACKGROUND OF THE INVENTION

1. Field of the Invention

The invention relates to a method and a system for managing image data, and more particularly, to a method and a system for managing image data uploaded via a network.

2. Description of the Related Art

Recently, a digital camera is equipped in a portable communication terminal (hereinafter, referred to as a client terminal), such as a PDA (Personal Digital Assistant), a cellular phone, etc., and provides original image data of an object captured thereby to the client terminal. Then, the client terminal compresses the original image data to form a compressed image file having a data compression format, and stores it. Also, the client terminal can transfer the compressed original image data file to a receiver via a network. The receiver is another client terminal or communication terminal being able to download compressed image files via the network, such as a personal computer, a PDA, etc. But, since the storage capacity of a client terminal is typically very low, an additional system is required for managing the compressed image files (i.e., the compressed original image data).

To meet this requirement, the conventional image data management systems generally transfer a compressed image file, uploaded from a client terminal, to a database. And, the conventional systems transfer the compressed image file stored in the database to a receiver, responsive to an image transfer command externally inputted. Also, the conventional systems decode the compressed image file, and then display the original image of the object.

However, when the file size of a compression image file is large, there is a disadvantage in the conventional systems that a retrieval time is increased for reading out the compression image file, so that a time interval is increased in display of the original image. Therefore, a need exists for an image data management system and method in which search and retrieval of image files in a database are performed more efficiently to reduce the time period for processing the image data.

SUMMARY OF THE INVENTION

To overcome the above and other disadvantages, the invention provides an image data management method using a network and being able to reduce a retrieval time period.

The invention also provides an image data management system for performing the method via the network.

In one aspect of the invention, there is provided an image data management method comprising the steps of: (a) storing an original image data file, uploaded from a client terminal via a network, in a database; (b) generating a preview image data file by using the original image data file; (c) storing the preview image data file in the database; and (d) linking the preview image data file with the original image data file. Wherein, the preview image data file has a predetermined file size much smaller than that of the original image data file, and includes a preview image substantially same as an original image included in the original image data file. Wherein the original image data file is a compressed image file having a predetermined compression format, and the step (b) includes the steps of: (b1) reading out the compressed image file from the database; and (b2) decoding the compressed image file to generate the preview image data file.

In another aspect of the invention, there is provided an image data management system comprising a storage device, an image management device, a retrieval device and an image process device. The storage device stores information of a client, at least one original image data file and at least one preview image data file linked with the original image data file. Wherein, the file size of the preview image data file is smaller than that of the original image data file. The image management device generates the preview image data file by using the original image data file, and links the preview image data file with the original image data file. The retrieval device reads out the original image data file from the storage device, on the basis of search data externally provided. The image process device processes the original image data file, which is read out by the retrieval device. In this case, the image process device provides an image selection page to the client terminal so that the client selects at least one preview image data file, and then generates the search data for the preview image data file selected by the client.

BRIEF DESCRIPTION OF THE DRAWINGS

The foregoing and further features and advantages of the invention will become more apparent from the following description and the accompanying drawings, in which the same reference numerals indicate the same or corresponding parts.

DETAILED DESCRIPTION OF THE INVENTION

Figure 1:
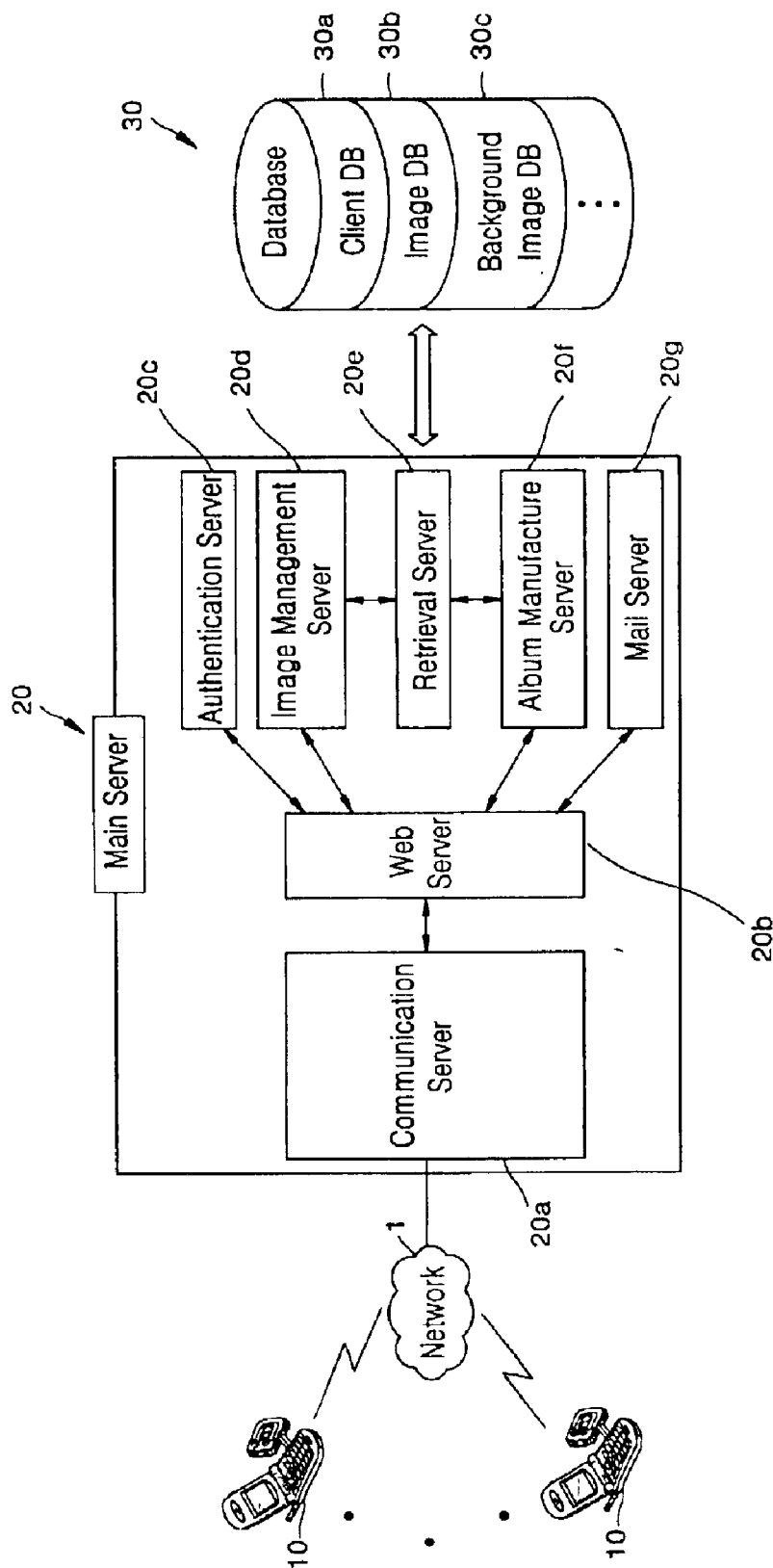
FIG. 1 is a block diagram showing an image data management system according to one exemplary embodiment of the invention.

FIG. 1 is a block diagram showing an image data management system according to one exemplary embodiment of the invention. Referring to FIG. 1, the image data management system includes a main server 20 and a database 30. The main server 20 communicates with multiple client terminals 10 via a network 1.

In this embodiment, the network 1 is a communication network, such as a cable communication network or a wireless communication network, for transferring one or more compressed image data files, album files, signals, personal information of one or more clients, etc.

A client terminal 10 has a web browser for accessing the main server 20, and generates compressed image data files each obtained from original image data provided by a digital camera. Also, the client terminal 10 transfers the compressed image data files and signals to the main server 20, and downloads the compressed image data files and the album files from the main server 20. The signals include an image upload signal (IMG_UP), a "Shared" selection signal (SHARE) or a "Not Shared" selection signal (NOT_SHARE), an album manufacture request signal (ALBUM_REQ), a preview selection signal (PRE_SEL), a background image selection signal (BIMG_SEL), and a transfer request signal (TR_REQ) for the compressed image data files and/or the album files. The client terminal 10 may be made by changing or modifying a general potable communication terminal. Therefore, detailed description for the client terminal 10 is omitted in this specification.

The main server 20 transfers the personal information and the compressed image data files to the database 30. The personal information and the compressed image data files are uploaded from the client terminal 10. Also, the main server 20 supplies an album manufacture service, a file transfer service, an image sharing service, etc. to the clients via the network 1. The personal information is information about a client registered as a member. Also, the main server 20 reads out a compressed image data file stored in the database 30, and decodes the same. Thereafter, the main server 20 generates a preview image file to be transferred to the database 30. Then, the main server 20 links the preview image file with the compressed image data file. The preview image file includes a preview image substantially same as an original image included in the compressed image data file. But, the image size of a preview image is smaller than that of an original image. For example, when the image size of an original image is 100 mm (millimeter)×152 mm, the image size of a preview image can be 25 mm (millimeter)×35 mm. Therefore, the overall file size of a preview image file is much smaller than that of a compressed image data file.

The main server 20 includes multiple sub-servers each for performing a programmed function. In this embodiment, the main server 20 includes a communication server 20a, a web server 20b, an authentication server 20c, an image management server 20d, a retrieval server 20e, an album manufacture server 20f and a mail server 20g. Each of the servers 20a through 20g has at least one program for performing its own function.

The communication server 20a has a communication program to access the network 1 and interfaces communication between one or more of the client terminals 10 and one or more of the sub-servers, for example the mail server 20g, in the main server 20.

The web server 20b selectively connects a client terminal 10 to the authentication server 20c, the image management server 20d, the retrieval server 20e, the album manufacture server 20f or the mail server 20g. In other words, when a client terminal 10 accesses the web server 20b, the web server 20b connects the client terminal 10 to the authentication server 20c. Also, when the authentication server 20c authenticates the client as the member registered in the database 30, the web server 20b provides a primary page to the client terminal 10. The primary page is formed for the client to select one of the services, such as the album manufacture service, the file transfer service and the image sharing service. Thereafter, the web server 20b connects the client terminal 10 to one of the image management server 20d, the retrieval server 20e, the album manufacture server 20f and the mail server 20g, according to the client's selection.

The authentication server 20c authenticates the client according to a predetermined authentication process. That is, the authentication server 20c requests a log-in of the client, in order to receive a membership I.D. and a password of the client. And, the authentication server 20c searches the database 30 to confirm whether the client is the member registered in the database 30 or not. As a result of the confirmation, when the client is not a member, the authentication server 20c guides the client in accordance with a predetermined member registration process. And, for registering the client as a member, the authentication server 20c transfers the client information to the database 30. The client information is uploaded during the member registration process. The client information includes the personal information (e.g., name, e-mail address, telephone number, etc.), the membership I.D., and the password. Then, the authentication server 20c requests the log-in of the client again. On the other hand, as a result of the confirmation, when the client is the member, the authentication server 20c generates a predetermined authentication message.

The image management server 20d transfers a compressed image data file to the database 30. The compressed image data file is uploaded from the client terminal 10. And, the image management server 20d reads out the compressed image data file stored in the database 30, and then decodes the compressed image data file to generate a preview image file corresponding to the compressed image data file decoded. Thereafter, the image management server 20d transfers the preview image file to the database 30, and simultaneously links the preview image file with the compressed image data file. Further, the image management server 20d provides a "Shared" or "Not Shared" selection page to the client terminal 10, so that the client determines whether to share or not to share the image files (i.e., compressed image data file and preview image file). When the client selects the "Shared" option, the image management server 20d records the "Shared" option of the image files in the database 30. That is, the image management server 20d records the image files as shared image files in the database 30. Also, when the client selects the "Not Shared" option, the image management server 20d records the "Not Shared" option of the image files in the database 30. That is, the image management server 20d records the image files as non-shared image files in the database 30.

The retrieval server 20e retrieves a compressed image data file linked with a preview image file from the database 30, on the basis of search data provided from the album manufacture server 20f or the mail server 20g. Then, the retrieval server 20e reads out the retrieved compressed image data file, and provides the same to the album manufacture server 20f or the mail server 20g.

The album manufacture server 20f provides an image selection page to the client terminal 10. An image selection page is formed for a client to select at least one preview image file, which is linked with a compressed image data file uploaded from a client and/or a shared compressed image data file of other client. Then, the album manufacture server 20f generates search data for the preview image file selected by the client, and provides the search data to the retrieval server 20e. Thereafter, for manufacturing an album file, the album manufacture server 20f decodes the compressed image data file provided from the retrieval server 20e, and inserts the original image of the decoded image data file into the album file. It should be noted that since the image search and retrieval in and from the database 30 is performed using preview image files, the time period for the image search and retrieval in the present invention is reduced in comparison with that of the conventional image search and retrieve systems. Also, the album manufacture server 20f reads out background images from the database 30, and provides them to the client terminal 10 so that the client selects at least one background image. Then, the album manufacture server 20f inserts the background image, which is selected by the client, into the album file.

The mail server 20g provides the image selection page to the client terminal 10 connected thereto, and then provides the search data to the retrieval server 20e, in similar manner to what the album manufacture server 20f does for the image search and retrieval. Also, the mail server 20g provides a receiver's address input page (ADDR_IN_PG) to the client terminal 10, onto which the client enters address information (e.g., a telephone number, an e-mail address, etc.) of at least one receiver. And, the mail server 20g downloads the compressed image data file, which is provided from the retrieval server 20e, to the receiver.

The database 30 includes a client DB 30a for storing personal information of each client, an image DB 30b for storing the image files and schematic information for each image provider (i.e., a client registered as a member), and a background image DB 30c for storing the background images to be inserted in the album file.

Figure 2A:
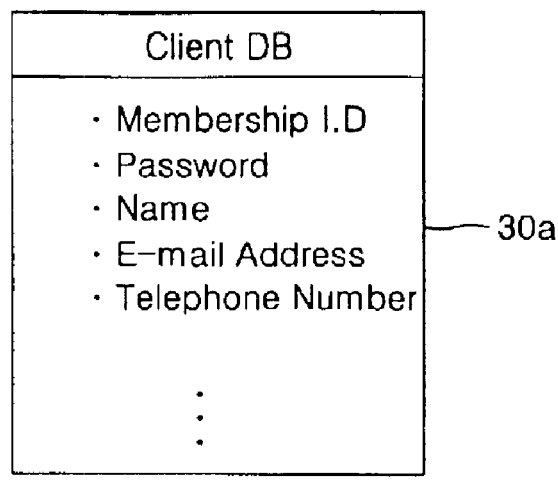
FIGS. 2A to 2C respectively illustrate data stored in a database shown in FIG. 1, and a format of the data.
Figure 2B:
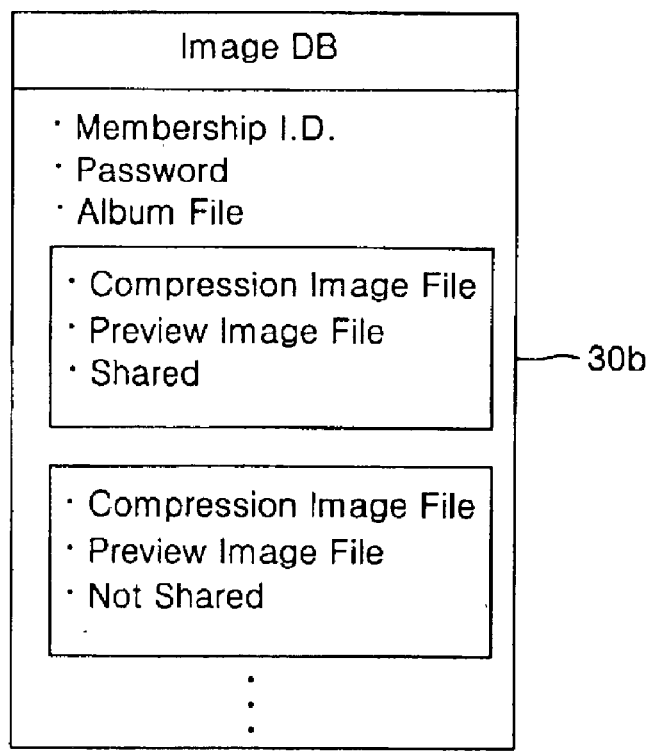
Figure 2C:
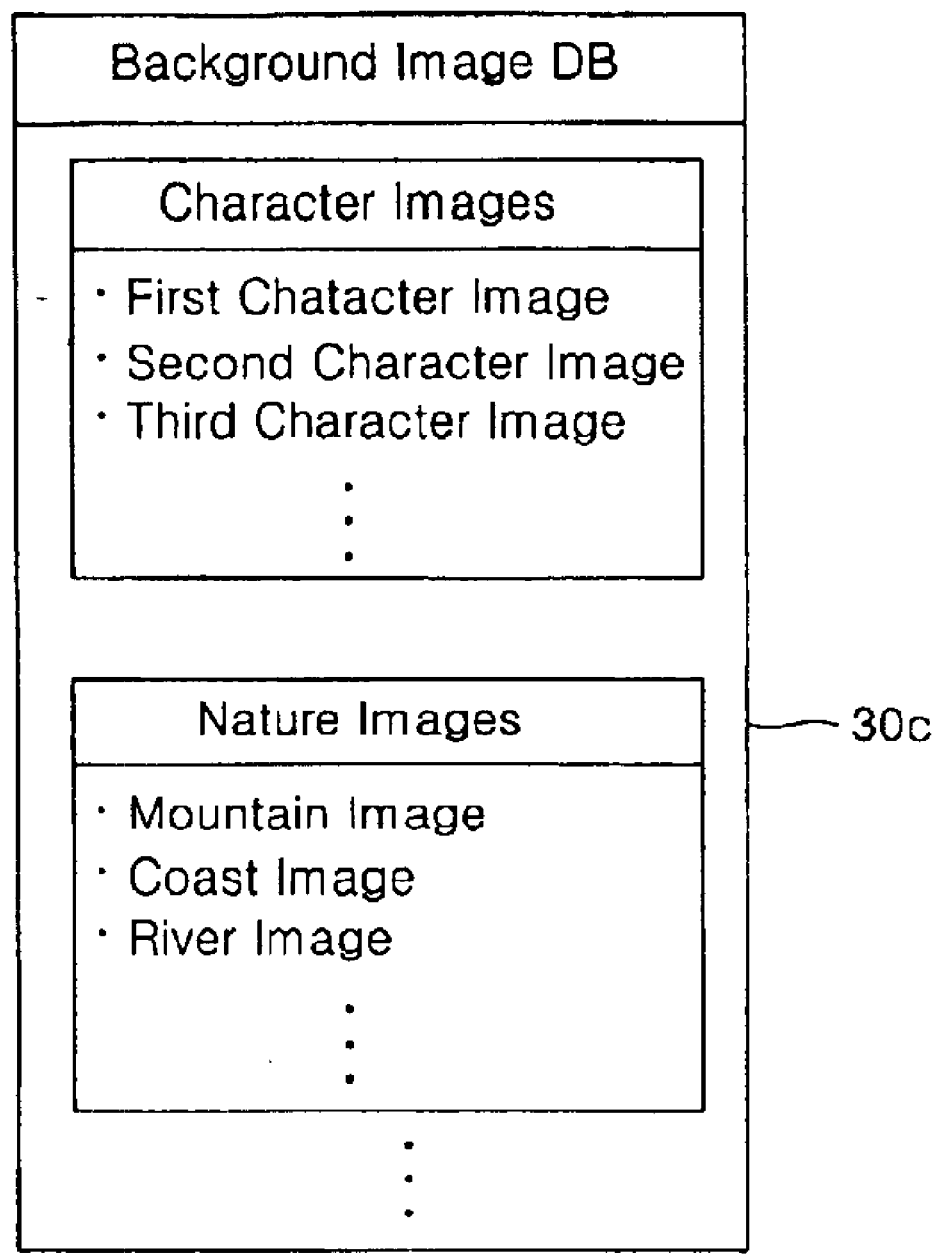

FIGS. 2A to 2C respectively illustrate data stored in the client DB 30a, the image DB 30b and the background image DB 30c of the main server 20 shown in FIG. 1.

Referring to FIG. 2A, the client DB 30a stores personal information of each client, such as membership I.D., password, name, e-mail address, telephone number, etc.

Referring to FIG. 2B, the image DB 30b stores the membership I.D. of an image provider, the password of an image provider, the compressed image data files uploaded from an image provider, the preview image files respectively linked with the compressed image data files, and the album files. Also, in the image DB 30b, either the "Shared" or the "Not Shared" option for the image files is recorded.

Referring to FIG. 2C, the background image DB 30c stores character images and nature images to be inserted in the album file. The character images include multiple classified character images, such as first through N-th character image. The nature images include mountain image, coast image, river image, etc.

Figure 3A:
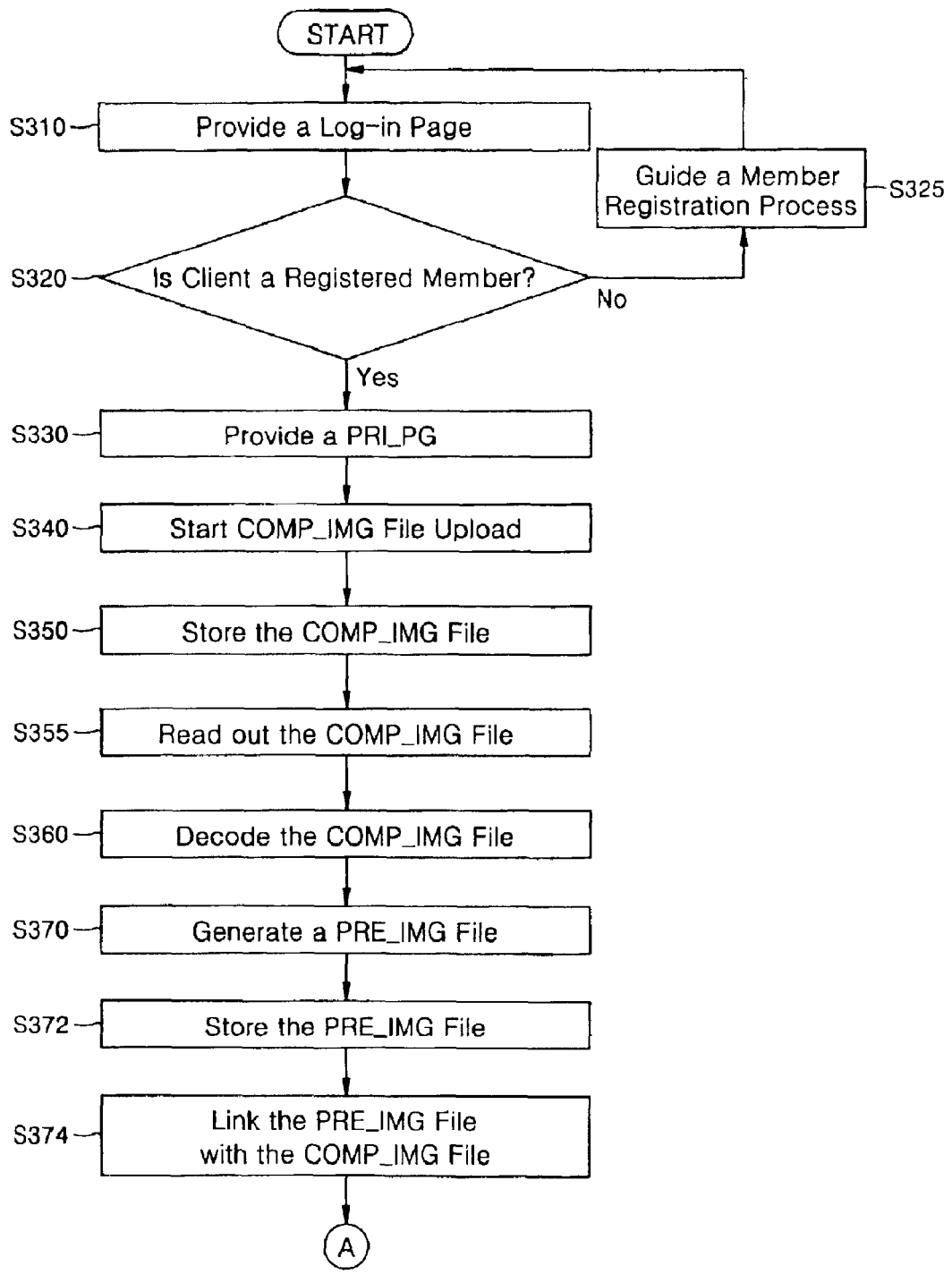
FIGS. 3A and 3B are flowcharts for explaining an image data upload process of an image data management method of the invention.
Figure 3B:
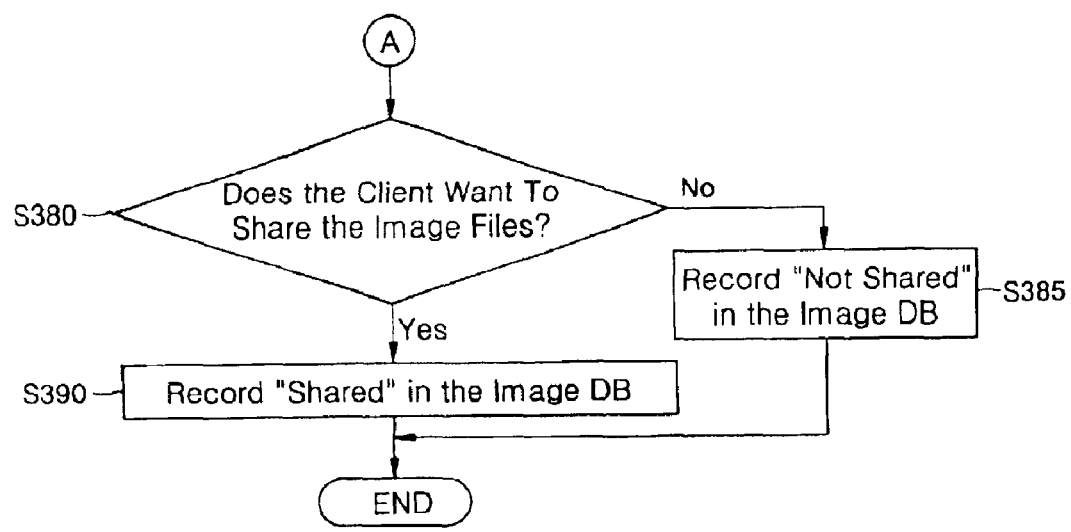

FIGS. 3A and 3B are flowcharts for explaining an image data upload process of an image data management method of the present invention. Referring to FIGS. 1, 3A and 3B, when the client terminal 10 accesses the web server 20b, the web server 20b connects the client terminal 10 to the authentication server 20c. Then, the authentication server 20c provides a log-in page to the client terminal 10 so that the client performs the log-in, at step S310. Thereafter, the authentication server 20c searches the client DB 30a to confirm whether the client is a registered member or not, at step S320. And, when the client is not a registered member, the authentication server 20c guides the member registration process in order to register the client as a member, at step S325. On the other hand, when the client is a registered member, the authentication server 20c generates an authentication message.

Figure 4:
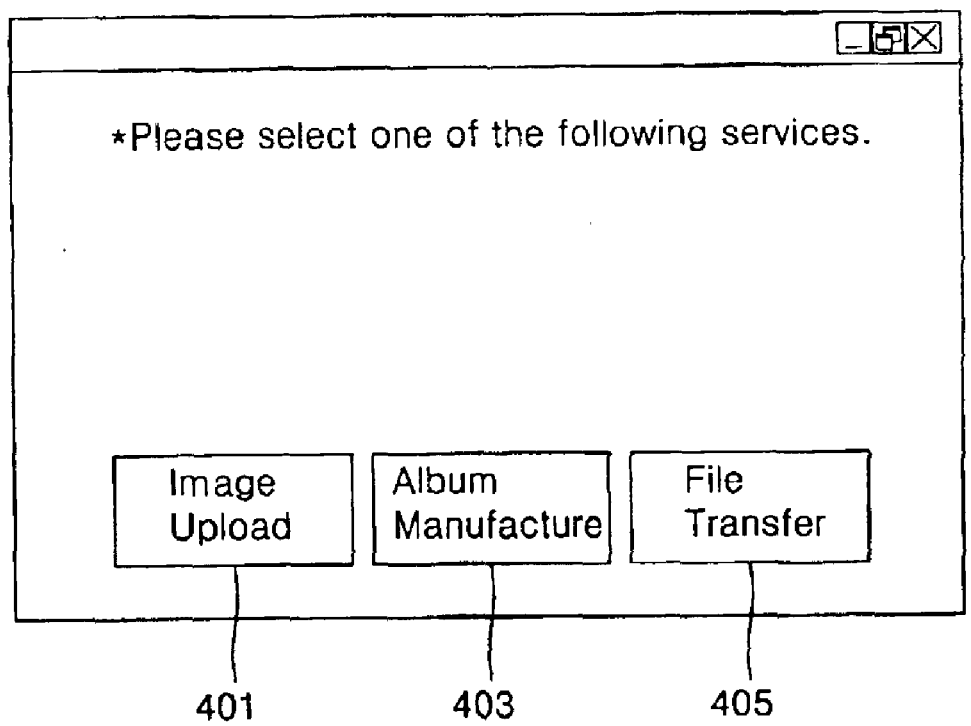
FIG. 4 represents an example of a primary page provided to a client terminal during the image data upload process shown in FIGS. 3A and 3B.

When the authentication message is generated, the web server 20b provides a primary page (PRI_PG) to the client terminal 10, at step S330. Referring to FIG. 4, the primary page (PRI_PG) has an "Image Upload" button 401, an "Album manufacture" button 403 and a "File Transfer" button 405.

When the client clicks the "Image Upload" button 401, the web server 20b receives an image upload signal (IMG_UP), and connects the client terminal 10 to the image management server 20d for starting the image upload. Then, the image management server 20d uploads a compressed image data (COMP_IMG) file from the client terminal 10, at step S340, and transfers the compressed image data (COMP_IMG) file to the image DB 30b in order to store the same in the image DB 30b, at step S350. Also, the image management server 20d reads out and decodes the compressed image data (COMP_IMG) file stored in the image DB 30b, at steps S355 and S360, and then generates a preview image (PRE_IMG) file corresponding to the compressed image data (COMP_IMG) file, at step S370. The image management server 20d transfers the preview image (PRE_IMG) file to the image DB 30b in order to store the same, at step S372. Continuously, the image management server 20d links the preview image (PRE_IMG) file with the compressed image data (COMP_IMG) file, at step S374.

Figure 5:
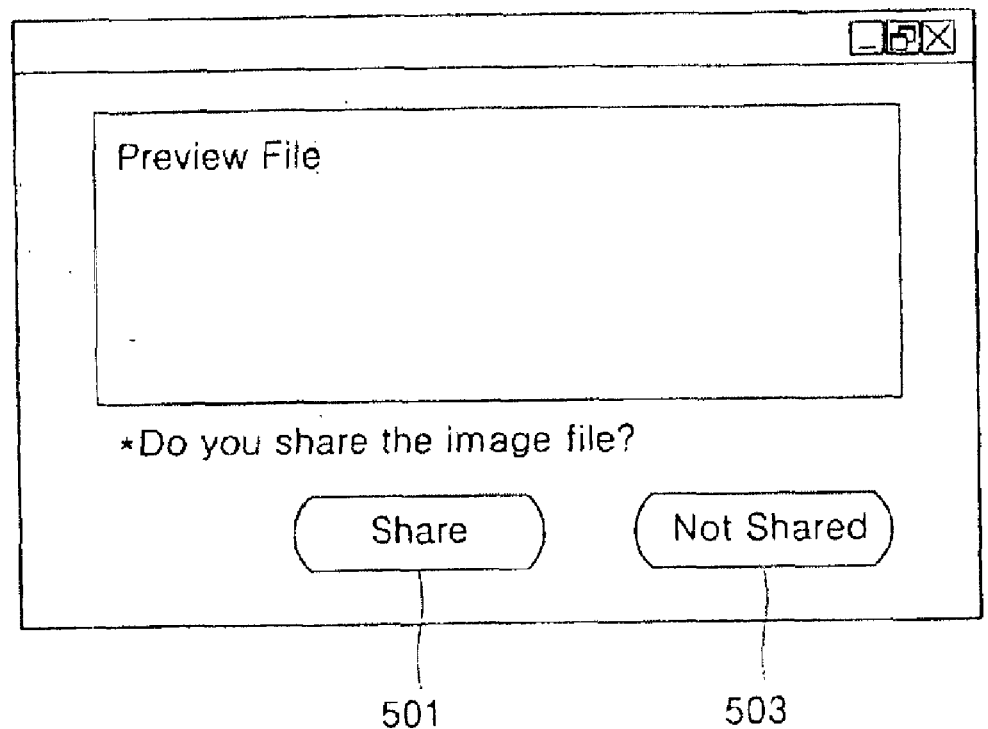
FIG. 5 represents an example of a "Shared" or "Not Shared" selection page provided to the client terminal during the image data upload process shown in FIGS. 3A and 3B.

Thereafter, the image management server 20d provides a share selection page to the client terminal 10, so that the client determines whether the image files (i.e., the preview image file and the compressed image data file) are shared or not shared, at step S380. Referring to FIG. 5, the share selection page has the preview image file, a "Shared" button 501 and a "Not Shared" button 503.

When the client clicks the "Shared" button 501, the image management server 20*d* receives a "Shared" selection signal (SHARE), and records the compressed image data file and the preview image file in the image DB 30*b* as "Shared" files, at step S390. As above-mentioned, when the client wants to show the image files to other clients, the client can easily share them with the other clients.

On the other hand, when the client clicks the "Not Shared" button 503, the management server 20*d* receives a "Not Shared" selection signal (NOT_SHARE), and records the compressed image data file and the preview image file in the image DB 30*b* as "Not Shared" files, at step S385.

Figure 6:
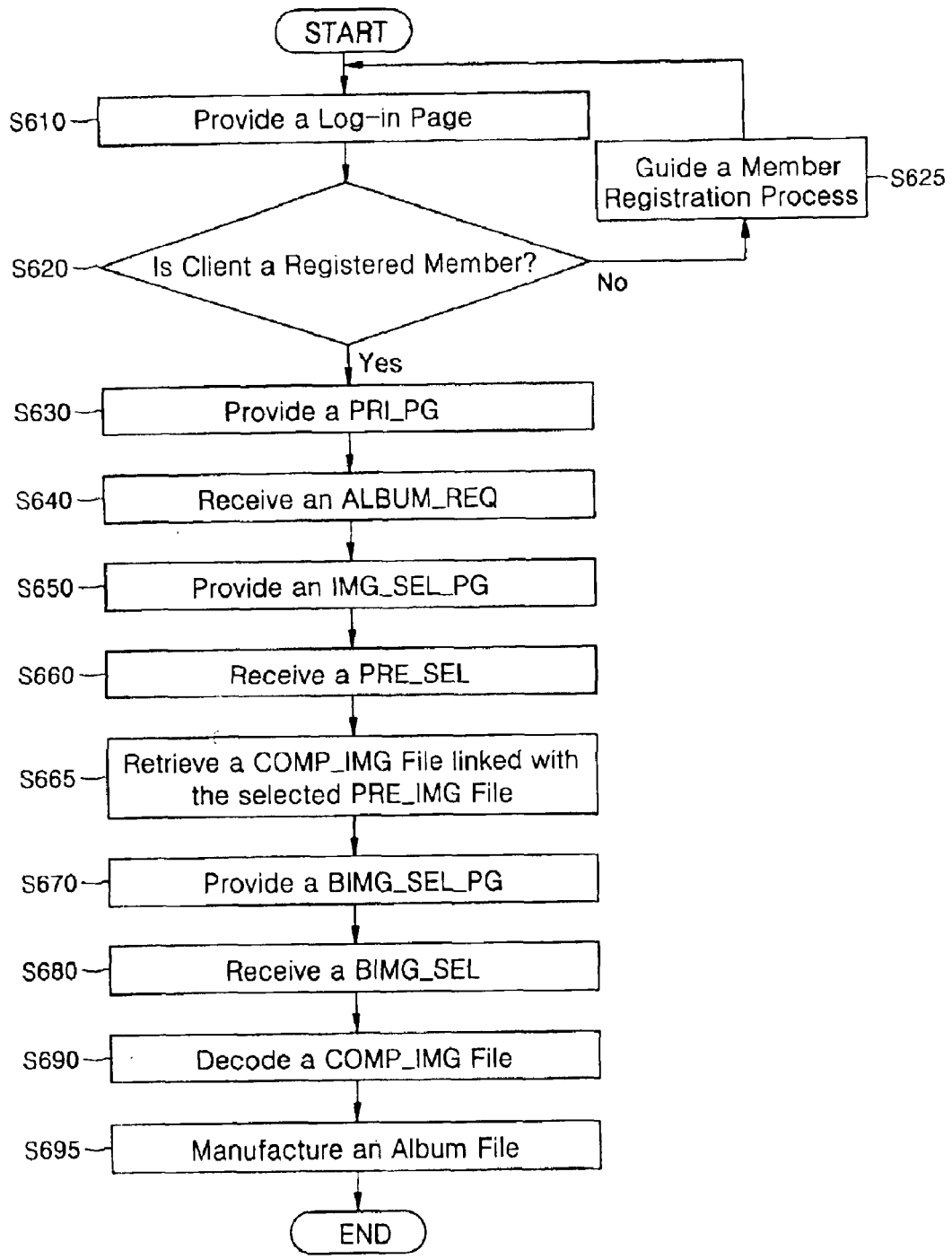
FIG. 6 is a flowchart for explaining an album manufacture process of the image data management method of the invention.

FIG. 6 is a flowchart for explaining an album manufacture process of the image data management method of the present invention. Referring to FIGS. 1 and 6, when the client terminal 10 accesses the web server 20*b*, the authentication server 20*c* performs steps S610, S620 and S625 for authenticating the client. The steps S610, S620 and S625 are substantially same as the steps S310, S320 and S325 in FIG. 3A. Accordingly, detailed description for the steps S610, S620 and S625 is omitted. After the authentication steps S610, S620 and S625, the web server 20*b* provides the primary page (PRI_PG) to the client terminal 10, at step S630, when the authentication message is generated.

Then, when the client clicks the "Album Manufacture" button 403 (referring to FIG. 4), the web server 20*b* receives an album manufacture request signal (ALBUM_REQ), at step S640, and connects the client terminal 10 to the album manufacture server 20*f*.

Figure 7:
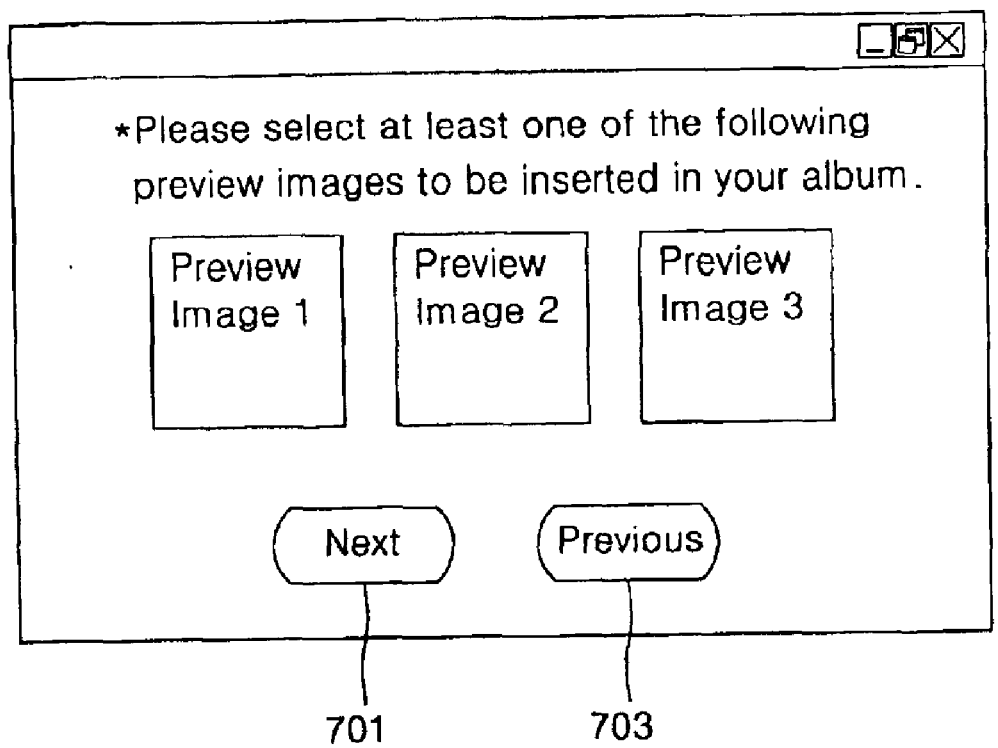
FIG. 7 represents an example of an image selection page provided to the client terminal during the album manufacture process shown in FIG. 6.

In this case, the album manufacture server 20*f* provides the image selection page to the client terminal 10 so that the client selects at least one preview image (PRE_IMG) file, at step S650. Referring to FIG. 7, the image selection page displays preview image files being able to be selected, a "Next" button 701 and a "Previous" button 703.

And, when the client selects at least one preview image (PRE_IMG) file, the album manufacture server 20*f* receives a preview selection signal (PRE_SEL), at step S660, and provides search data for the selected preview image (PRE_IMG) file to the retrieval server 20*e*. Then, the retrieval server 20*e* retrieves the compressed image data (COMP_IMG) file linked with the preview image (PRE_IMG) file from the image DB 30*b*, in accordance with the search data, at step S665. And, the retrieval server 20*e* reads out the retrieved compressed image data (COMP_IMG) file, and provides the same to the album manufacture server 20*f*.

Continuously, the album manufacture server 20*f* provides a background image selection page (BIMG_SEL_PG) to the client terminal 10, and then receives a background image selection signal (BIMG_SEL) from the client terminal 10, at steps S670 and S680. Then, the album manufacture server 20*f* decodes the compressed image data (COMP_IMG) file linked with the selected preview image (PRE_IMG) file, at step S690. The background image selection page (BIMG_SEL_PG) has the contents similar to those of the image selection page (IMG_SEL_PG).

Thereafter, the album manufacture server 20*f* manufactures an album file, at step S695. The original image and the background image, which are selected by the client, are inserted in the album file by the album manufacture server 20*f*. The album file is stored in the image DB 30*b*, and can be transferred to one or more other receivers. The image transfer to other receivers is described in detail below. According to the image data management method and system of the present invention, a client can easily manufacture the album file by using the preview image (PRE_IMG) files, of which the file size is relatively small.

Figure 8:
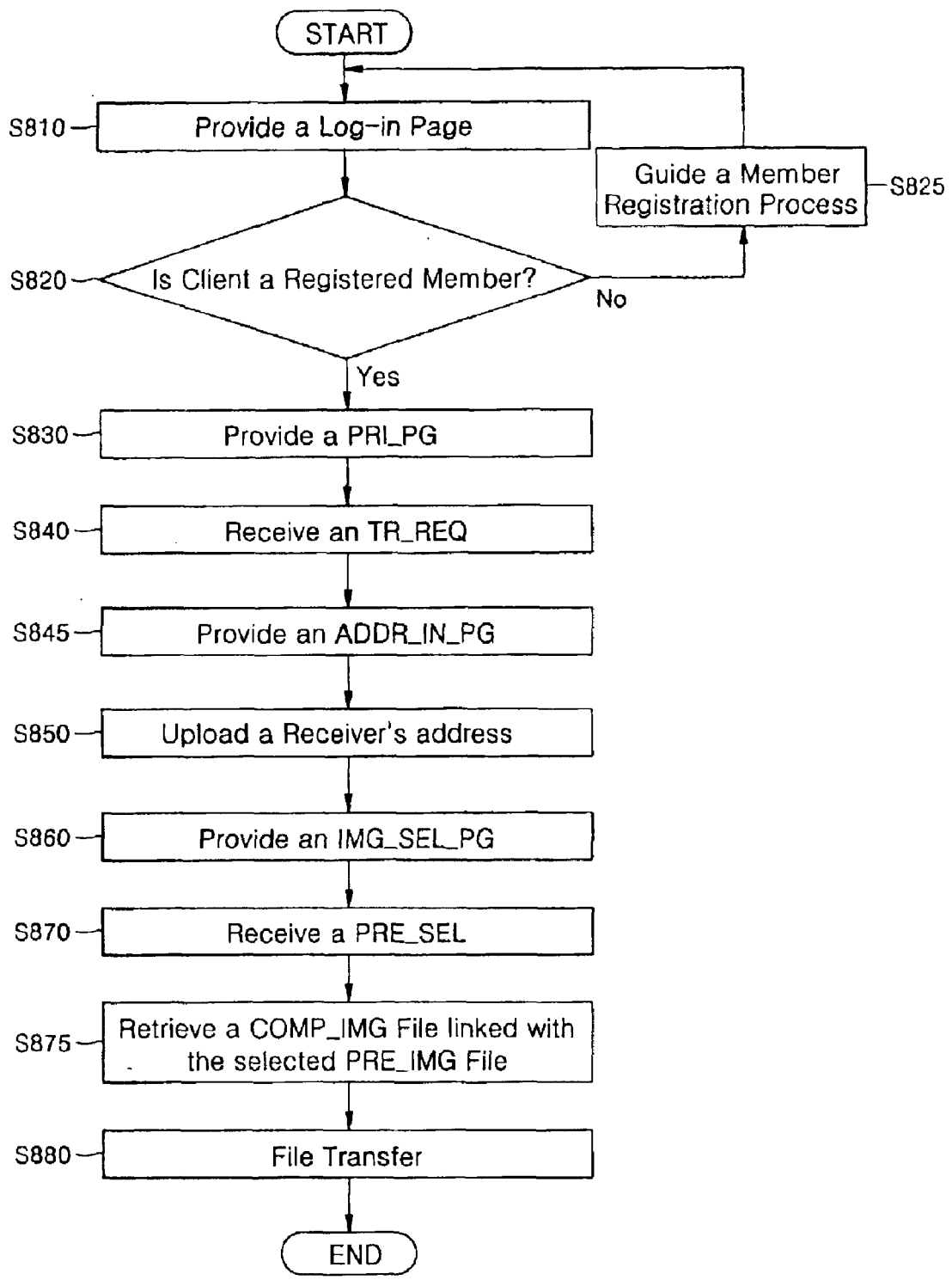
FIG. 8 is a flowchart for explaining a file transfer process of the image data management method in the invention.

FIG. 8 is a flowchart for explaining an image data transfer process of the image data management method of the present invention. Referring to FIGS. 1 and 8, when the client terminal 10 accesses the web server 20*b*, the web server 20*b* connects the client terminal 10 to the authentication server 20*c*. In this case, for authenticating the client, the authentication server 20*c* performs steps S810, S820 and S825 substantially same as the steps S310, S320 and S325 in FIG. 3A, and then generates the authentication message. When the authentication message is generated, the web server 20*b* provides the primary page (PRI_PG) to the client terminal 10, at step S830.

And, when the client clicks the "File Transfer" button 405 (referring to FIG. 4), the web server 20*b* receives a transfer request signal (TR_REQ), at step S840, and connects the client terminal 10 to the mail server 20*g*.

Then, the mail server 20*g* provides the receiver's address input page (ADDR_IN_PG) to the client terminal 10, at step S845, and uploads the receiver's address from the client terminal 10, at step S850. Thereafter, the mail server 20*g* provides the image selection page (IMG_SEL_PG) to the client terminal 10, at step S860, and receives the preview selection signal (PRE_SEL) from the client terminal 10, at step S870.

In this case, the mail server 20*g* provides the retrieval server 20*e* with search data for the preview image (PRE_IMG) file selected by the client. Then, the retrieval server 20*e* retrieves the compressed image data (COMP_IMG) file linked with the preview image (PRE_IMG) file in the image DB 30*b*, in accordance with the search data, at step S875. And, the retrieval server 20*e* provides the retrieved compressed image data (COMP_IMG) file to the album manufacture server 20*f*.

Then, the mail server 20*g* transfers the compressed image data (COMP_IMG) file to the receiver, at step 880. In this case, since the client searches the image DB 30*b* with the preview image (PRE_IMG) file of which the size is smaller than that of the compressed image data (COMP_IMG) file, the image search can be rapidly performed.

Figure 9:
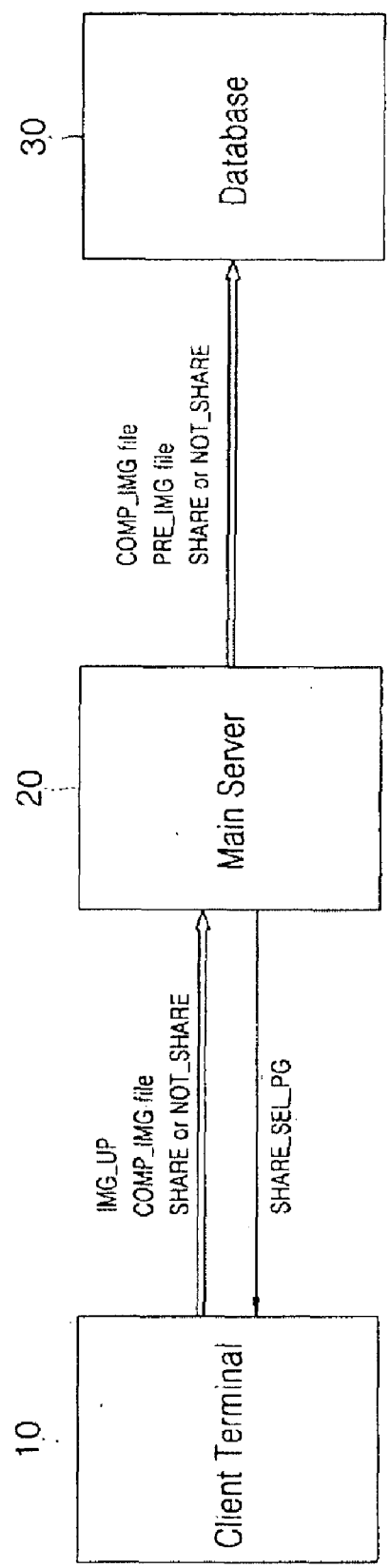
FIG. 9 is a block diagram for explaining the image data upload process shown in FIGS. 3A and 3B.

FIG. 9 is a block diagram for explaining the image data upload process shown in FIGS. 3A and 3B. Referring to FIGS. 1, 4 and 9, when the client registered as a member clicks the "Image Upload" button 401 on the primary page (PRI_PG), the main server 20 receives the image upload signal (IMG_UP). Then, the main server 20 uploads the compressed image data (COMP_IMG) file from the client terminal 10, and transfers the same to the database 30.

Then, the main server 20 stores the uploaded compressed image data (COMP_IMG) in the database 30. Thereafter, the main server 20 reads out the compressed image data (COMP_IMG) from the database 30 and decodes the compressed image data (COMP_IMG) file to generate the preview image (PRE_IMG) file. The preview image (PRE_

IMG) file includes the preview image of which size is smaller than that of the original image. Thereafter, the main server 20 transfers the preview image (PRE_IMG) file to the database 30. And, the main server 20 links the preview image (PRE_IMG) file with the compressed image data (COMP_IMG) file.

Further, the main server 20 provides the share selection page (SHARE_SEL_PG) to the client terminal 10, and receives either the "Shared" selection signal (SHARE) or the "Not Shared" selection signal (NOT_SHARE). Thereafter, the main server 20 records the "Shared" or the "Not Shared" for the preview image (PRE_IMG) file and the compressed image data (COMP_IMG) file in the database 30.

Figure 10:
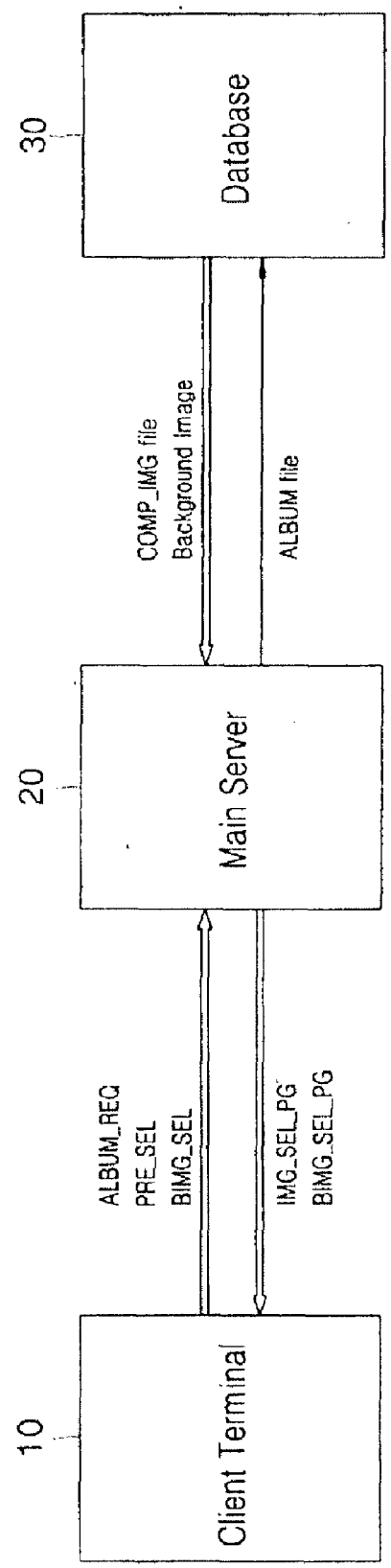
FIG. 10 is a block diagram for explaining the album manufacture process shown in FIG. 6.

FIG. 10 is a block diagram for explaining the album manufacture process shown in FIG. 6. Referring to FIGS. 1, 6 and 10, when the client registered as a member clicks the "Album Manufacture" button 403 on the primary page (PRI_PG) (referring to FIG. 4), the main server 20 receives the album manufacture request signal (ALBUM_REQ). Then, the main server 20 provides the image selection page (IMG_SEL_PG) to the client terminal 10, and receives the preview selection signal (PRE_SEL) from the client terminal 10. In this case, the client can also select shared preview image (PRE_IMG) files provided by other clients.

Thereafter, the main server 20 provides the background image selection page (BIMG_SEL_PG) to the client terminal 10. Then, the main server 20 retrieves the compressed image data (COMP_IMG) file from the database 30, in order to read out the compressed image data (COMP_IMG) file linked with the preview image (PRE_IMG) file selected by the client. Also, the main server 20 receives the background image selection signal (BIMG_SEL) from the client terminal 10. In this case, the main server 20 searches the background image selected by the client in the database 30. Thereafter, the main server 20, which inserts the original image and the background image, manufactures the album (ALBUM) file. Also, the main server 20 transfers the album (ALBUM) file to the database 30.

Figure 11:
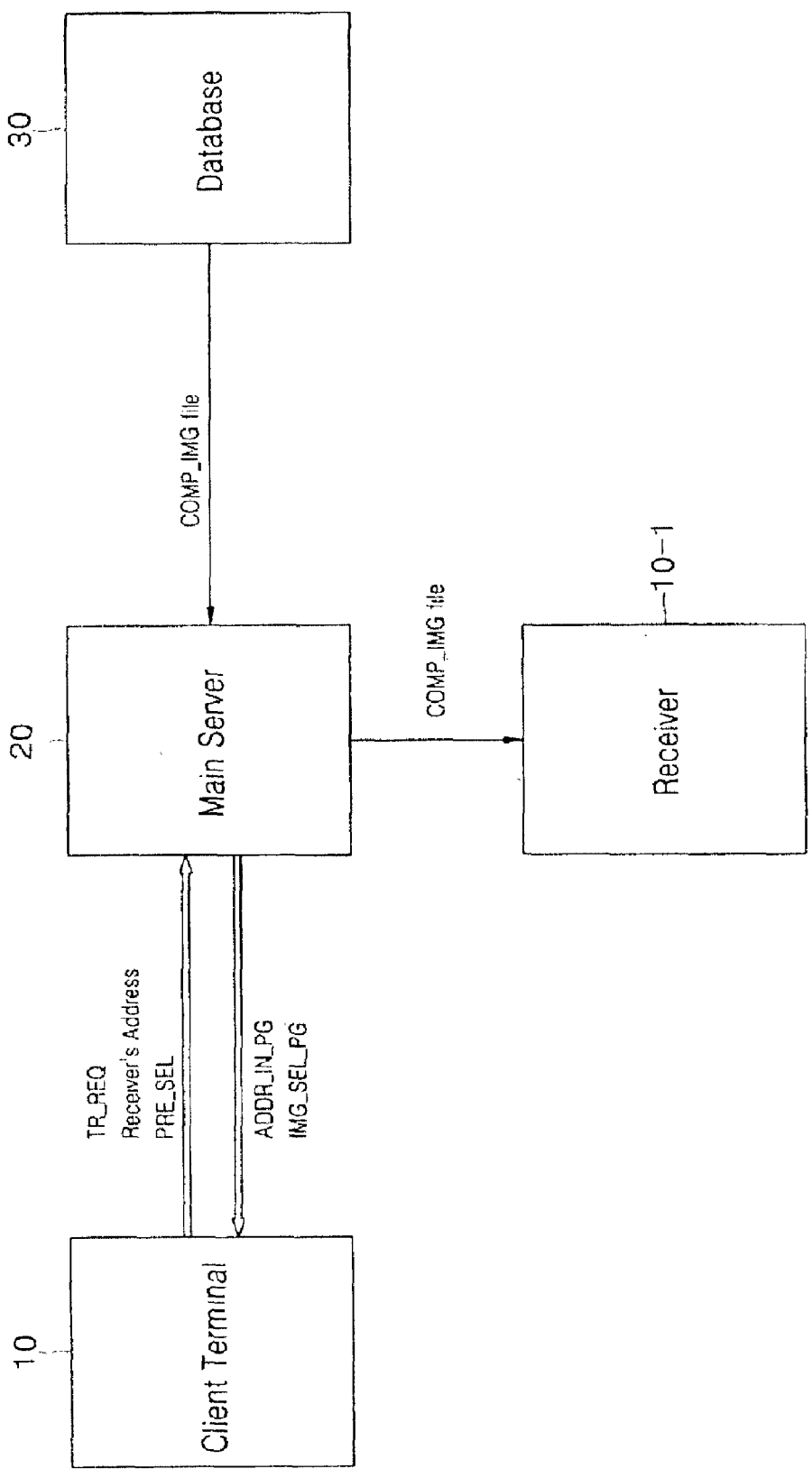
FIG. 11 is a block diagram for explaining the file transfer process shown in FIG. 8.

FIG. 11 is a block diagram for explaining the image data transfer process shown in FIG. 8. Referring to FIGS. 1, 8 and 11, when the client registered as a member clicks the "File Transfer" button 405 on the primary page (PRI_PG) (referring to FIG. 4), the main server 20 receives the transfer request signal (TR_REQ). In this case, the main server 20 provides the receiver's address input page (ADDR_IN_PG) to the client terminal 10, and uploads the receiver's address.

Then, the main server 20 provides the image selection page (IMG_SEL_PG) to the client terminal 10, and receives the preview selection signal (PRE_SEL) from the client terminal. In this case, the main server 20 retrieves the database 30 on the basis of the search data for the preview image (PRE_IMG) file selected by the client. The main server 20 reads out the compressed image data (COMP_IMG) file linked with the selected preview image (PRE_IMG) file from the database 30. Thereafter, the main server 20 transfers the compressed image data (COMP_IMG) file to the receiver 10-1.

The above described embodiments may be implemented with a computer-readable medium (or, article of manufacture) comprising program instructions for managing original image data uploaded from a terminal of a client via a network by performing: storing an original image data file, uploaded from a client terminal via the network, in a database; generating a preview image data file by using the original image data file; storing the preview image data file in the database; and linking the preview image data file with the original image data file. Wherein, the preview image data file has a predetermined file size smaller than that of the original image data file, and includes a preview image substantially same as an original image included in the original image data file. The term "computer-readable medium" as used herein is intended to encompass one or more computer programs and data files accessible from one or more computer-readable devices, carriers, or media, such as magnetic storage media, floppy disk, CD-ROM, DVD-ROM, etc.

As above-mentioned, in the present invention, time period for the image search and retrieval is remarkably reduced regardless of the file size of a compressed image data file, since the image search and retrieval is performed by using a preview image file having a file size smaller than that of a compressed image data file. Therefore, according to the image data management method and system of the present invention, the retrieval of the original image files requires less time than the conventional image retrieval systems do.

Further, the image data management system of the present invention provides various services, such as the album manufacture service, the file transfer service, the image sharing service, etc.

While this invention has been particularly shown and described with reference to the embodiments thereof, it will be understood by those skilled in the art that various changes and equivalents may be made without departing from the spirit and scope of the invention.

For example, in the embodiment, the client terminal 10 compresses the image data of objects to generate the compressed image data files, and then uploads the compressed image data files to the main server 20. But, in another embodiment, the main server 20 can receive the image data from the client terminal 10, and compress the same to generate the compressed image data files.

Also, in the embodiment, the authentication process is performed for each of the image data upload process, the album manufacture process and the file transfer process. But, in another embodiment, the image data upload process, the album manufacture process and the file transfer process may be selectively performed after one authentication process.

Therefore, it is intended that the invention not be limited to the particular embodiment disclosed as the best mode contemplated for carrying out this invention, but that the invention will include all embodiments within the scope of the appended claims.

What is claimed is:

1. An image data management method for managing an original image data file uploaded from a terminal of a client, the terminal accessing a web server via a network, comprising the steps of:

(a) storing the original image data file in a database;

(b) generating a preview image data file by using the original image data file, the preview image data file having a predetermined file size smaller than that of the original image data file, and the preview image data file including a preview image substantially same as an original image included in the original image data file;

(c) storing the preview image data file in the database; and (d) linking the preview image data file with the original image data file.

2. The image data management method in accordance with claim 1, further comprising the steps of:

(e) receiving a transfer request signal from the client terminal, the transfer request signal being a signal for requesting a transfer of the original image data file stored in the database;

(f) providing a receiver's address input page to the client terminal, and receiving an address of at least one receiver;

(g) providing an image selection page to the client terminal, the image selection page being formed for a client to select at least one preview image data file;

(h) retrieving an original image data file from the database, the retrieved original image data file being linked with the preview image data file selected by the client; and (i) transferring the retrieved original image data file to the receiver via the network.

3. The image data management method in accordance with claim 2, further comprising the steps of:

(j) providing a share selection page to the client terminal, the share selection page being formed for a client to determine whether to share an original image data file or not;

(k) recording the original image data file as a shared original image data file in the database, when the client determines to share the original image data file; and (l) recording the original image data file as a non-shared original image data file in the database, when the client determines not to share the original image data file, and wherein the image selection page displays at least one preview image data file linked with the original image data file uploaded from the client or the shared original image data file uploaded from other client.

4. The image data management method in accordance with claim 3, wherein the original image data file is a compressed image file having a predetermined compression format, and wherein the step (b) includes the steps of: (b1) reading out the compressed image file from the database; and (b2) decoding the compressed image file to generate the preview image data file.

5. The image data management method in accordance with claim 1, further comprising the steps of:

(m) receiving an album manufacture request signal from the client terminal;

(n) providing an image selection page to the client terminal, the image selection page being formed for a client to select at least one preview image data file;

(o) retrieving an original image data file from the database, the retrieved original image data file being linked with the preview image data file selected by the client; and (p) manufacturing an album file by inserting the original image included in the retrieved original image data file.

6. The image data management method in accordance with claim 5, further comprising the steps of:

(q) providing a receiver's address input page to the client terminal, and receiving an address of at least one receiver; and (r) transferring the album file to the receiver via the network.

7. The image data management method in accordance with claim 6, further comprising the steps of:

(s) providing a share selection page to the client terminal, the share selection page being formed for a client to determine whether to share an original image data file or not; and (t) recording the original image data file as a shared original image data file in the database, when the client determines to share the original image data file; and (u) recording the original image data file as a non-shared original image data file in the database, when the client determines not to share the original image data file, and wherein the image selection page displays at least one preview image data file linked with the original image data file uploaded from the client or the shared original image data file uploaded from other client.

8. The image data management method in accordance with claim 7, wherein the original image data file is a compressed image file having a predetermined compression format, and wherein the step (b) includes the steps of: (b1) reading out the compressed image file from the database; and (b2) decoding the compressed image file in order to generate the preview image data file, and wherein the step (p) includes the step of (p1) decoding the retrieved compression image file to manufacture the album file.

9. An image data management system for managing an original image data file uploaded from a terminal of a client, comprising:

a storage device for storing information of the client, at least one original image data file and at least one preview image data file linked with the original image data file, wherein the preview image data file has a predetermined file size smaller than that of the original image data file, and includes a preview image substantially same as an original image included in the original image data file;

an image management device for generating the preview image data file by using the original image data file, transferring the original image data file and the preview image data file to the storage device, and linking the preview image data file with the original image data file;

a retrieval device for retrieving the original image data file from the storage device to read out the original image, on the basis of search data externally provided; and an image process device for processing the original image read out by the retrieval device, the image process device providing an image selection page to the client terminal so that the client selects at least one preview image data file, and generating the search data for the preview image data file selected by the client.

10. The image data management system in accordance with claim 9, wherein the storage device further stores a plurality of background images, and wherein the image process device includes an album manufacture device for providing a background image selection page from which the client selects at least one background image, and then manufacturing an album file by inserting the original image and the background image.

11. The image data management system in accordance with claim 10, wherein the original image data file is a compressed image file having a predetermined compression format, and wherein the album manufacture device decodes the compressed image file before manufacturing the album file, the compressed image file being retrieved by the retrieval device.

12. The image data management system in accordance with claim 9, wherein the image process device includes:

a mailing device for providing a receiver's address input page and the image selection page to the client terminal, and transferring the original image data file to a receiver via the network, the original image data file being selected by the client, wherein the receiver's address input page is formed for the client to input an address of the receiver; and a communication device for interfacing the transfer of the original image data file between the client terminal and the mailing device.

13. The system in accordance with claim 12, wherein the image management device provides a share selection page to the client terminal, and records the original image data file as a shared original image data file or a non-shared original image data file in the storage device, according to a choice of the client, and wherein the image selection page provides at least one preview image data file linked with at least one shared original image data file uploaded from other client.

14. A computer-readable medium comprising program instructions for managing an original image data file uploaded from a terminal of a client via a network by performing the steps of:

storing the original image data file in a database;

generating a preview image data file by using the original image data file, the preview image data file having a predetermined file size smaller than that of the original image data file, and the preview image data file including a preview image substantially same as an original image included in the original image data file;

storing the preview image data file in the database; and linking the preview image data file with the original image data file.

15. The computer-readable medium in accordance with claim 14, further comprising the steps of:

receiving a transfer request signal from the client terminal, the transfer request signal is a signal for requesting a transfer of the original image data file stored in the database;

providing a receiver's address input page to the client terminal, and receiving an address of at least one receiver;

providing an image selection page to the client terminal, the image selection page being formed for a client to select at least one preview image data file;

retrieving an original image data file from the database, the retrieved original image data file being linked with the preview image data file selected by the client; and transferring the retrieved original image data file to the receiver via the network.

16. The computer-readable medium in accordance with claim 14, further comprising the steps of:

receiving an album manufacture request signal from the client terminal;

providing an image selection page to the client terminal, the image selection page being formed for a client to select at least one preview image data file;

retrieving an original image data file from the database, the retrieved original image data file being linked with the preview image data file selected by the client; and manufacturing the album file by inserting the original image included in the retrieved original image data file.

* * * * *